UNITED STATES PATENT OFFICE.

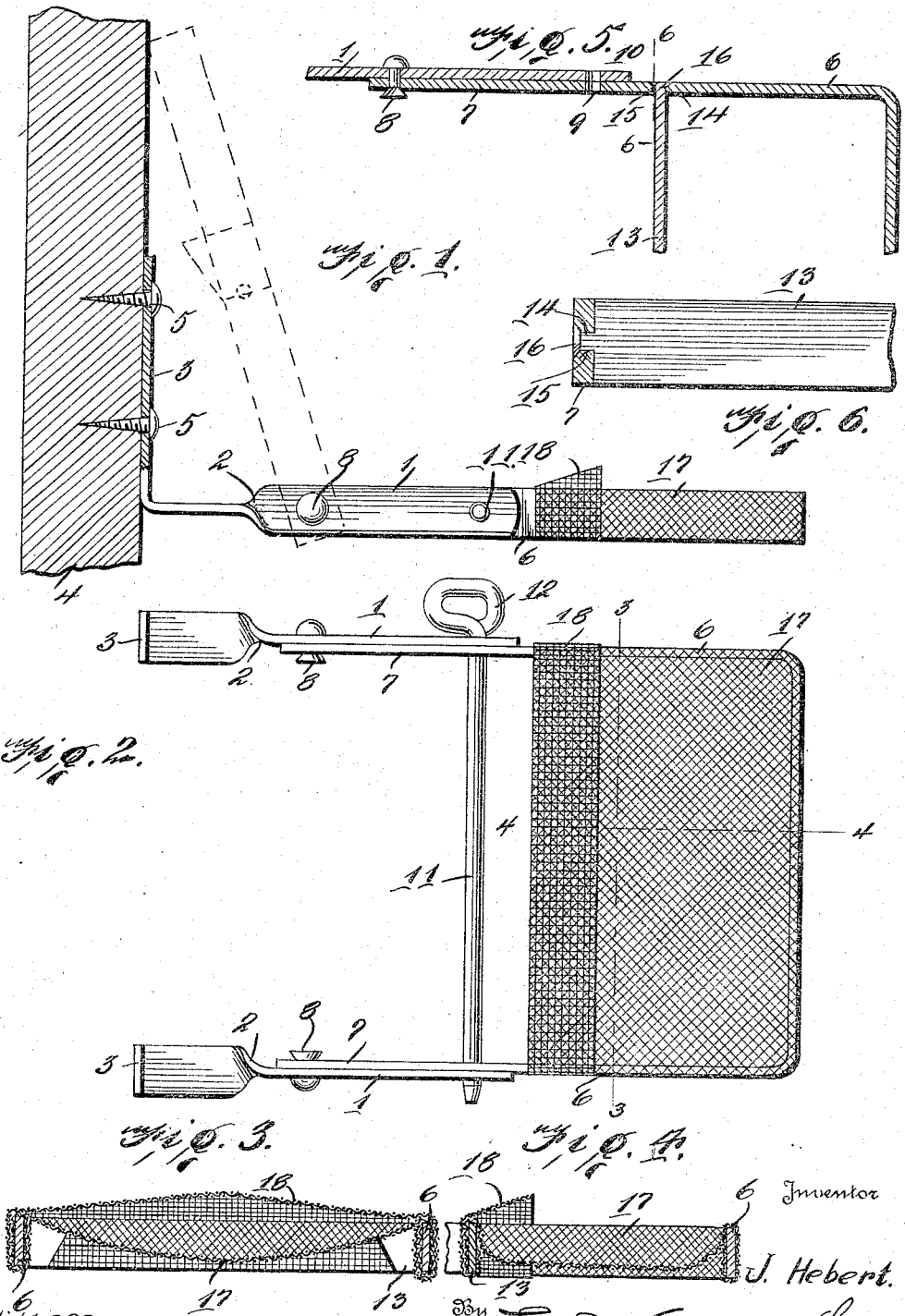

JOSEPH HEBERT, OF ORANGE, TEXAS.

HEN-NEST.

1,192,196. Specification of Letters Patent. Patented July 25, 1916.

Application filed October 26, 1915. Serial No. 58,009.

*To all whom it may concern:*

Be it known that I, JOSEPH HEBERT, a citizen of the United States, residing at Orange, in the county of Orange and State of Texas, have invented certain new and useful Improvements in Hen-Nests, of which the following is a specification, reference being had therein to the accompanying drawing.

This invention relates to nests for hens and has for its principal object the production of a nest which may be retained in a horizontal position for use when so desired, but which may be swung upwardly so as to prevent a fowl from roosting thereon during the night.

Another object of this invention is the production of a hen's nest wherein the nest portion is provided with a pocket so that when the nest is swung upwardly the nest egg will be caught by the pocket so as to be retained in a position to move again to the central portions of the nest when the nest is again swung to a horizontal plane.

With these and other objects in view this invention consists of certain novel combinations, constructions, and arrangements of parts as will be hereinafter fully described and claimed.

In the accompanying drawing: Figure 1 is a side elevation of the nest as constructed in accordance with this invention, portions of the same being shown in section. Fig. 2 is a top plan view of the nest. Fig. 3 is a section taken on the line 3—3 of Fig. 2. Fig. 4 is a section taken on the line 4—4 of Fig. 2. Fig. 5 is an enlarged fragmentary sectional view of a portion of the nest frame. Fig. 6 is a section taken on the line 6—6 of Fig. 5.

Referring to the accompanying drawing by numerals it will be seen that the nest comprises a plurality of side bars 1, which are twisted intermediate their ends, as shown at 2. Each side bar is also provided with an upwardly bent end 3, which extends at right angles to the side portions of the bars 1. These forwardly extending ends 3 are adapted to be positioned upon a supporting wire structure 4, so as to be retained in position by means of the screws 5, or any other suitable securing means. By this construction it will be noted that the twisting of the bars will allow the portions which engage the support 4 to rest evenly thereon, while the portion upon which the pivoted frame is secured will extend so as to fit snugly upon the frame when necessary.

The pivoted frame comprises a U-shaped body 6, wherein side portions 7 extend upwardly so as to fit between the side bars 1. The inner ends of the frame 6 are pivotally secured to the side bars at a distance from the end of these side bars 1 by means of the rivets 8, which pass through the side bars 1 adjacent the twisted portions 2, and through the inner ends of the sides 7 of the pivoted frame 6. The sides 7 are provided with alined openings 9 which are formed so as to register with the openings 10 formed in the bars 1 adjacent their ends, when the pivoted frame is swung to a horizontal position. A pin 11 having a head 12 may pass through these openings 9 and 10, as clearly shown in Fig. 2, so as to releasably retain the pivoted frame in its correct horizontal position. The U-shaped body 6 is adapted to carry the brace bar 13 intermediate the ends of the sides 7 as clearly shown in Fig. 5. This brace bar 13 is provided with a neck 14 at its end which is adapted to be passed through the opening 15 beneath each side 7, so that when each neck is riveted, as shown at 16, the brace bar will be fixedly retained in its correct position in engagement with the pivoted frame. A wire mesh 17 is positioned upon the pivoted frame 6 so as to engage the outer end of the pivoted frame, the brace bar 13, and the body 6 adjacent the brace bar, and the forward end of the frame. The wire mesh is retained in position by being wound about the frame 6 and the brace bar 13, as disclosed clearly in Figs. 3 and 4. It will be seen that by mounting the mesh 17 upon the frame and binding the same thereon, it will extend downwardly toward its central portions. Therefore, when a nest egg is positioned within the nest it will be rolled to the central portions of the mesh, so as to be easily in view of the hen. A second strip of mesh 18 is wound about the brace bar 13, and over the side portions of the frame 6, and is bent outwardly so as to have its free edge extend at a spaced distance from the inner portions of the nest portion formed by the mesh 17.

When this device is in use the frame is swung to a horizontal plane so as to allow the openings 9 and 10 to register. The pin 11 is then passed through these openings until the head 12 comes into engagement with one of the side bars 1. At this time the nest will be carried in a horizontal plane, with the nest egg in the central portion of the nest portion formed by the wire mesh 17. When at night it is desired to prevent fowls from roosting upon the nest, the pin 11 is withdrawn, and at this time the frame may be swung upon the rivets 8 and moved upwardly to the position disclosed in dotted lines in Fig. 1. When the nest extends in this position it will be impossible for fowls to roost thereon. The nest egg carried by the nest will roll into the pocket formed by the strip 18 and will be carried in the pocket when the pivoted frame is in the position indicated by dotted lines in Fig. 1. When the nest, however, is again swung to a position for use the egg will roll over the mesh down into the central portions of the nest formed by the mesh 17. If at any time it is desired to free the nest of vermin or hen lice, a piece of paper may be positioned beneath the nest and ignited so as to allow the flames to pass upwardly through the wire meshes 17 and 18 and around the pivoted frame and side bars. This operation may be repeated as frequently as desired, so as to render the nest perfectly sanitary. It is, of course, obvious that if it is desired to use the nest for setting purposes a piece of paper can be positioned so as to be supported upon the mesh 17 for preventing air currents from coming into engagement with the eggs positioned upon the mesh 17.

From the foregoing description it will be seen that a very simple and efficient hen nest has been produced wherein a pivoted frame is provided so as to allow the same to be withdrawn for preventing fowls from roosting thereon during the night, and which is constructed with a pocket portion for always retaining the nest egg in a position to be easily seen when the nest is swung to its normal position, said nest being so constructed as to allow the same to be easily cleaned as desired.

What is claimed is:

1. In a nest of the class described, the combination of a pair of side bars, a frame pivotally secured to said side bars, means for releasably retaining said frame in a horizontal plane when in use, said frame being adapted to be swung upwardly when not in use for preventing fowls from roosting thereon, a pocket portion carried by said frame, and a nest carried by said frame and communicating with said pocket portion, whereby as said frame is swung upwardly the nest egg carried by said nest portion may be caught by said pocket so as to be held in a position to again move into said nest portion when the nest is swung to a horizontal plane.

2. In a nest of the class described, the combination of a pair of side bars, said side bars being adapted to be fixedly secured to a support, a U-shaped frame pivotally secured to said side bars, said frame and side bars provided with registering openings, a pin removably carried by said side bars and frame by passing through said openings, a wire mesh carried upon the outer portions of said frame for forming a nest portion, a brace bar carried by said frame, said mesh engaging said brace bar whereby the mesh will be positively retained in its correct position, and a second mesh positioned upon said brace bar and extending outwardly from the inner portions of said wire mesh, whereby when said frame is swung upwardly so as to prevent fowls from roosting thereon, said mesh strip may catch the nest egg for preventing its displacement.

In testimony whereof I hereunto affix my signature.

JOSEPH HEBERT.

Copies of this patent may be obtained for five cents each, by addressing the "Commissioner of Patents, Washington, D. C."